(12) United States Patent
Wolf

(10) Patent No.: US 7,587,672 B2
(45) Date of Patent: Sep. 8, 2009

(54) FILE CONTENT PREVIEW TOOL

(75) Inventor: Jason Wolf, Los Gatos, CA (US)

(73) Assignee: SAP AG, Walldorf (DE)

( * ) Notice: Subject to any disclaimer, the term of this patent is extended or adjusted under 35 U.S.C. 154(b) by 352 days.

(21) Appl. No.: 11/645,920

(22) Filed: Dec. 27, 2006

(65) Prior Publication Data

US 2008/0163122 A1 Jul. 3, 2008

(51) Int. Cl.
*G06F 15/00* (2006.01)
*G06F 13/00* (2006.01)

(52) U.S. Cl. ................................ 715/711; 715/765

(58) Field of Classification Search ......... 715/763–765, 715/711, 862, 853–856, 804, 847
See application file for complete search history.

(56) References Cited

U.S. PATENT DOCUMENTS

| | | | |
|---|---|---|---|
| 7,185,001 | B1 | 2/2007 | Burdick et al. |
| 2003/0020749 | A1 | 1/2003 | Abu-Hakima et al. |
| 2003/0167324 | A1 | 9/2003 | Farnham et al. |
| 2004/0001106 | A1* | 1/2004 | Deutscher et al. ........... 345/838 |
| 2004/0078452 | A1* | 4/2004 | Jamieson ................... 709/218 |
| 2004/0220902 | A1 | 11/2004 | Gates et al. |
| 2006/0190817 | A1 | 8/2006 | Banks |
| 2008/0126951 | A1 | 5/2008 | Sood et al. |
| 2008/0162433 | A1 | 7/2008 | Wolf |
| 2008/0163118 | A1 | 7/2008 | Wolf |
| 2008/0163122 | A1 | 7/2008 | Wolf |

OTHER PUBLICATIONS

"Non-Final Office Action mailed Mar. 3, 2009 for U.S. Appl. No. 11/648,204", 12 pages.
"Non-Final Office Action mailed Mar. 9, 2009 for U.S. Appl. No. 11/648,842", 26 pages.

* cited by examiner

*Primary Examiner*—Cao (Kevin) Nguyen

(57) ABSTRACT

A system may include a selection tool configured to determine a selection of a file icon that is displayed on a user interface and that represents a file associated with an application. The selection tool may be further configured to determine a result-class associated with the selection. A parser may be configured to determine one or more rules associated with the result-class, access content of the file by way of an application program interface associated with the application, and parse the content of the file for a target-result, based on the result-class and the one or more rules. Presentation logic may be configured to provide at least a portion of the target-result in visual proximity to the file icon within the user interface.

16 Claims, 4 Drawing Sheets

FILE CONTENT PREVIEW TOOL

TECHNICAL FIELD

This description relates to a file content preview tool.

BACKGROUND

Computer users may interact with a large number of electronic files, such as, for example, word processing documents, spreadsheets, presentation slides, and web pages. In various situations, a user may have created a large number of files, or may have to review files created by others. Often, a type or description of information contained in the files may not be readily apparent to the user, and the user may have difficulty remembering or determining where a desired piece of information resides.

For example, if the user created twenty documents and recalls that one of the documents contains a link to a particular website, the user may not recall which of the twenty documents contains the particular website link. As another example, the user may be asked to review a number of files created by other users, and to determine a type of information (e.g., e-mail addresses) contained within the files.

In still other examples, it may occur that a user is fully aware that a particular file (e.g., document) contains a desired type of information, such as a website link. However, if the document is lengthy, it may be inconvenient for the user to use conventional techniques to open the lengthy document and locate the desired information therein.

Consequently, it may be difficult for a user to determine whether a desired type or piece of information is contained within a particular file. As a result, the user may require an undue amount of time to locate desired information, or may simply fail to locate, or be aware of, a desired piece of information within a file. In the latter case, the user may lose any benefit that may have been obtained from the information.

SUMMARY

Various embodiments of a file content preview tool are disclosed. According to an example embodiment, a system is disclosed. The system may include a selection tool configured to determine a selection of a file icon that is displayed on a user interface and that represents a file associated with an application, and the selection tool may be further configured to determine a result-class associated with the selection. The system also may include a parser configured to determine one or more rules associated with the result-class, access content of the file by way of an application program interface associated with the application, and parse the content of the file for a target-result, based on the result-class and the one or more rules. The system also may include presentation logic configured to provide at least a portion of the target-result in visual proximity to the file icon within the user interface.

According to another example embodiment, a method is disclosed. A selection of a file may be received, wherein the file comprises content associated with an application. A result-class may be determined, the result-class being associated with the selection and with one or more rules formulated based on locating members of the result-class within the content. The content may be parsed based on the one or more rules to determine a target-result including at least a portion of the content corresponding to the one or more rules. The target-result may be provided in association with the file, wherein the target-result is a member of the result-class.

According to another example embodiment, a computer program product is disclosed. The computer program product may be tangibly embodied on a computer-readable medium and may include executable code that, when executed, is configured to cause a data processing apparatus to store content of a file in a memory, parse the stored content for one or more portions of content consistent with rules associated with a result-class, the result-class including a category of information within the stored content, and display the one or more portions of content as selectable icons in a results window provided in association with the file, wherein the selectable icons are configured to provide complementary information associated with the one or more of the portions of content, upon selection.

The details of one or more implementations are set forth in the accompanying drawings and the description below. Other features will be apparent from the description and drawings, and from the claims.

DETAILED DESCRIPTION

Figure 1:
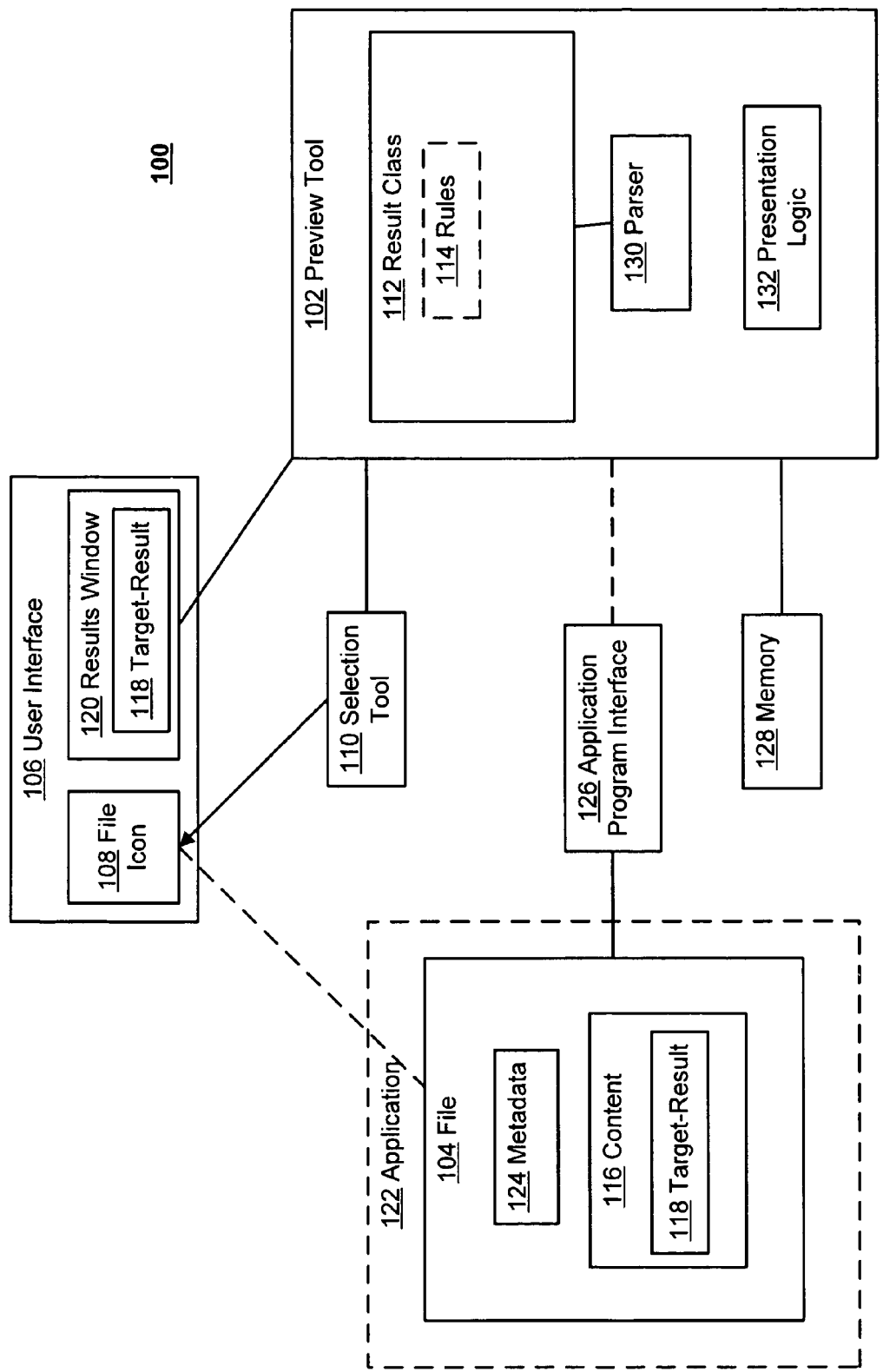
FIG. 1 is a block diagram of an example system for a file content preview tool, according to an example embodiment.

FIG. 1 is a block diagram of an example system 100 for a file content preview tool, according to an example embodiment. In the example of FIG. 1, the system 100 may parse the contents of a file and return a preview of the file including portions of the contents that belong to a class of information for which the file is being parsed. This may allow a user, for example, to quickly scan one or more files for types or classes of information for which the user may be looking, without requiring the user to open and review each file individually.

As just referenced, the preview tool 102 may include a system, application, device or other grouping of components configured to scan or parse one or more selected files for a category or class of information. The preview tool 102 may then return some or all of the instances of the category of information found in the file. For example, the preview tool 102 may search a file 104 for a class of information including website addresses contained within the file 104, and may then return a list of all the website addresses found in the file 104, including the number of website addresses found. Other examples of classes of information are described in more detail, below.

The file 104 may include text or images, or may include one or more documents or other stored units of information. The file 104 may reside on the same or on a different device than the preview tool 102. For example, the file 104 may include a file stored on a network device to which the preview tool 102 has access.

The file 104 may be represented on a user interface 106 by a file icon 108. The user interface 106 may be configured to allow a user to view and/or select the file 104 or the file icon 108. For example, the user interface 106 may be a visual desktop associated with an operating system, such as (one of) the Windows™ operating system(s), e.g., Windows XP™. In an example embodiment, the user interface 106 may operate on a first device, and may allow a user to select the file icon 108 representing the file 104 located on the same device, or on a second, perhaps remote, device.

The file icon 108 may include a graphical and/or textual representation of the file 104 on the user interface 106. For example, the file icon 108 may include a graphical image representing the file 104, or a name of the file 104, wherein a user may, for example, select (e.g., with a mouse or other interface device) the file icon 108 to open or otherwise access the file 104. According to another example embodiment, the file icon 108 may be a folder representing a grouping of multiple files 104.

The file icon 108 may be selected with a selection tool 110. The selection tool 110 may include, for example, a graphical user interface device configured to select the file 104 or the file icon 108. For example, the selection tool 110 may include a mouse pointer or other visual indicator (not shown in FIG. 1) that may select the file 104 by clicking on the file icon 108, or may select the file 104 by hovering over the file icon 108 for a period of time. In another example embodiment, the file 104 may be selected by using another user interface device, such as, for example, a keyboard, to select the file 104 or file icon 108.

In association with the selection of the file 104 (or file icon 108), a result-class 112 may be determined. The result-class 112 may be a category of information for which the file 104 is to be scanned or parsed, and in which a user may be interested. Some example result-classes 112 may include, but not be limited to, names, phone numbers, websites, addresses, and sports teams. In an example embodiment, a user may use the selection tool 110 to specify which result-class 112 the user is interested in previewing (e.g., by typing in a result-class, or selecting a result-class from a drop-down menu). In another example embodiment, multiple result-classes 112 may be specified, or a default result-class 112 may be used. In still other example embodiments, multiple instances of the selection tool 110 may each be associated with one or more different result-classes, so that a user may quickly switch between result-classes simply by activating a corresponding instance of the selection tool 110.

A result-class 112 may include, or be associated with, a set of rules 114. The rules 114 may specify patterns, strings, formulas, fonts, typeset, or other combinations of information and/or content for which the selected file 104 may be parsed, and with which the result-class 112 is associated. The rules 114 may include sub-categories or identifiers relating to one or more result-classes 112. For example, a result-class "websites" may include rules 114 including, but not limited to, "http://", "www.", ".com", ".biz", and ".org". Then, for example, the preview tool 102, or one of its components, may scan or parse content 116 of the file 104, based on the rules 114, in order to infer or otherwise determine a presence of instances of the desired result-class 112.

The content 116 may include information stored in the file 104 that may be parsed or scanned by the preview tool 102. For example, the content 116 may include images (or metadata associated therewith) or alpha-numeric text. For example, such alpha-numeric text may include one or more of the strings, patterns, formulas, fonts, or typesets that are associated with the rules 114, in a target-result 118 that is determined to be an instance of the result-class 112.

Thus, the target-result 118 may include one or more portions of the content 116 determined by the preview tool 102 to fall in the result-class 112 based on the rules 114. For example, if as referenced above, the result-class 112 is "websites" and the rules 114 associate the result-class 112 with text strings including one or more of "http://", "www.", ".com", ".biz", and ".org", then, for example, the target-result 118 may include portions of the content 116 including "www-.websitename.com", "http://insertwebsitenamehere", "website.org", and "http://www.websitewebsite.com.".

In an example embodiment, the results of in the target-result 118 may be provided in terms of relevance to the result-class 112. For example, each of the rules 114 may be given a weight pertaining to a likelihood that a portion of the content 116 matching the rule, i.e., the target-result 118, belongs to the result-class 112. For example, the target-result 118 "http://www.websitewebsite.com" may have the most relevance to the result-class 112 "website" because it matches the most rules 114, or matches ones of the rules designated as most significant (i.e., "http://", "www.", and ".com"), wherein "http://insertwebsitenamehere" may have greater relevance than "website.org" because the rule 114 "http://" may have a greater weight than the rule 114 ".org". According to another example embodiment, only those target-results 118 that have a great enough weight, e.g. relevance, may be provided. The target-result(s) 118 then, for example, may be displayed in the user interface 106, e.g., in a results window 120 in association with the file icon 108.

The results window 120 may include a window or other display that includes the target-result 118. For example, the results window 120 may include a pop-up window provided in close visual proximity to the file icon 108 within the user interface 106.

The content 116 of the file 104, including the target-result 118, may be associated with an application 122, wherein the content 116 may be accessed by the preview tool 102 through an application program interface 126 associated with the application 122. The application 122 may include an application, computer software or other program associated with, e.g., supporting or providing, the file 104 and/or the content 116. For example, the application 122 may include a word processing application wherein the file 104 may include a particular document file of the word processing application, and wherein the content 116 may include the text or body of the word processing file 104 associated with the word processing application. In another example embodiment, the content 116 may include a spreadsheet, or html code.

In addition to having the content 116 associated with the application 122, the file 104 may also include, or be associated with, metadata 124 associated with the content 116. The metadata 124 may include data that describes the content 116 or a characteristic of the content 116. For example, the metadata 124 may include information about when the content 116 was created, when the content 116 was last modified, and/or the author of the content 116. In an example embodiment, the metadata 124 may be located in the file 104 separate from the content 116. According to another example embodiment, the metadata 124 may be embedded within the content 116, wherein the metadata 124 may include one or more structured descriptions that may be used to aid in the identification and/or location of portions of the content. For example, the content 116 may include a "title" and an "author" metadata 124, wherein the portions of content associated with the title and author metadata 124 may include the title of the content 116 and the author of the content 116, respectively.

In an example embodiment, the preview tool 102 may, for example, scan or parse the content 116 of the file 108 for the result-class 112 using an application program interface 126. The application program interface 126 may be an interface configured to allow a program or application to access the content 116 of the file 104 associated with the application 122. For example, the application program interface 126 may provide a location and/or structure of the content 116 within the file 104. Then, for example, the preview tool 102 may be able to access the content 116 through the application program interface 126 without instantiating an instance of the file 104 and/or the application 122. Instantiating the file 104 or the application 122 may include, for example, starting the application 122 or otherwise viewing the content 116 of the file 104 using an active instance of the application 122. Then for example, the content 116 of the file 128 may be accessed through the application 122 and stored in memory 128. With the application program interface 126, however, the content 116 may be accessed independent of or without the application 122. This may allow the preview tool 102 to extract the content 116 from the file 104, without instantiating the file 128 and/or the application 122, by using the application program interface 126 to access and/or store the content 116 in the memory 128.

The memory 128 may include virtually any storage that may be used to store the content 116 of the file 104, such as, for example, a clipboard memory that may be associated with an operating system on which the application 122 and the preview tool 102 are running. For example, as discussed above the preview tool 102 may copy and/or otherwise extract the content 116 from file 104 using the application program interface 126 and store the content 116 on the memory 128. In another example embodiment, if application 122 was previously instantiated, the content 116 may be extracted from the file 104 through the application 122 and/or the application program interface 126.

The memory 128 may be parsed by a parser 130 to determine whether the content 116 includes any members of the result-class 112. The parser 130 may parse the content 116 based on the rules 114 to determine whether the file 104 includes any members or instances of the result-class 112. For example, the parser 130 may scan, parse and/or otherwise analyzer the content 116 to determine whether any portions of the content 116 match or correspond to the rules 114. Such matching and/or corresponding portions of content 116, i.e., the target-result 118, may then be provided to a presentation logic 132.

The presentation logic 132 may be configured to provide the target-result 118 in the results-window on the user interface 106. For example, the presentation logic 132 may provide the target-result 118 in the results (e.g., pop-up) window 120 on the user interface 106 near the file icon 108, wherein the target-result(s) 118 are ordered by relevance or by some other criteria. In another example embodiment, the presentation logic 132 may filter out duplicate results from the target-result 118 before providing the target-result 118 in the results window 120. According to another example embodiment, the presentation logic 132 may filter out results from the target-result 118 that do not meet a minimum level of relevance to the result-class 112.

Using the system 100 of FIG. 1, then, a user may quickly and easily review content of a large number of files for a desired class or type of information. The user need not know or remember exactly which instance, if any, of the class of information is within a particular file, but, rather, may simply check each file (or a group of files) with the appropriately-designated selection tool 110 for a given instance of the result-class 112. Consequently, the user's access to information, and correspondingly the user's productivity and efficiency, may be improved.

Figure 2:
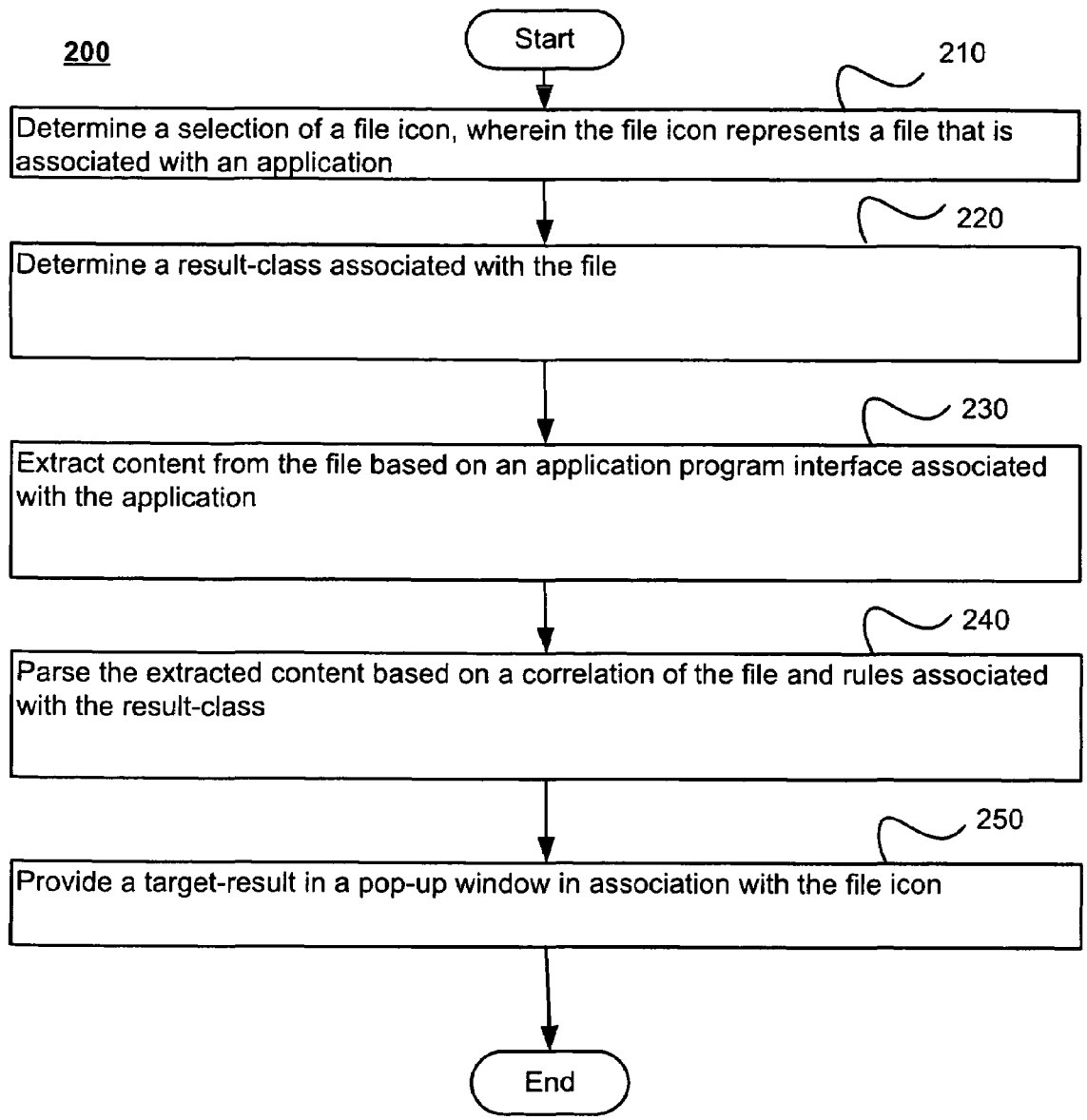
FIG. 2 is a flowchart illustrating example operations of the system of FIG. 1.

FIG. 2 is a flowchart 200 illustrating example operations of the system of FIG. 1. More specifically, FIG. 2 illustrates an operational flow 200 representing example operations related to previewing file content.

After a start operation, a selection of a file icon may be determined, the file icon representing a file associated with an application (210). For example, as shown in FIG. 1, the selection tool 110 may select the file icon 108, wherein the file icon 108 represents the file 104 associated with the application 122.

A result-class associated with the file may be determined (220). For example, the result-class 112 may be determined as "websites," "names," "addresses," or other categories of information, wherein the result-class is associated with the rules 114, as explained above.

Then, content from the file may be extracted based on an application program interface associated with the application (230). For example, the preview tool 102 may copy or extract the content 116 from the file 104 through the application program interface 126 associated with the application 122. The preview tool 102 may then, for example, store the extracted content 116 in the memory 128.

Then, the extracted content may be parsed based on a correlation of the file and the rules associated with the result-class (240). For example, the extracted content 116 (which may be stored in the memory 128), may be parsed by the parser 130. The parser 130 for example, may parse or scan the content 116 based on the rules 114 to locate portions of the content 116 that are determined or inferred to be members of the result-class 112, e.g., the target-result 118.

Then, a target-result may be provided in a pop-up window in association with the file icon (250). For example, the presentation logic 132 may provide the target-result 118 as a member of the result-class 112 in the results window 120 on the user interface 106, in association with the file icon 108.

Figure 3:
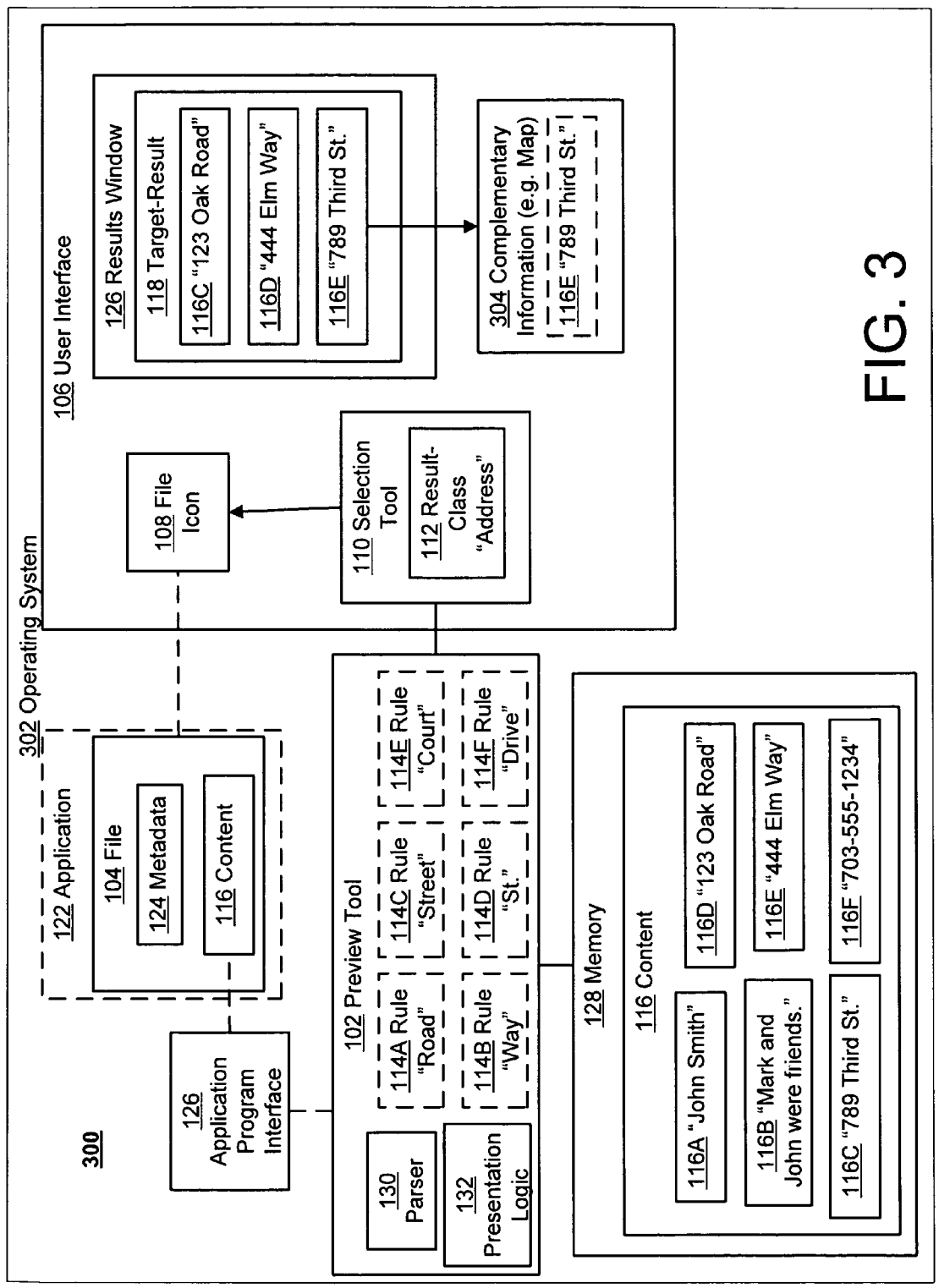
FIG. 3 is a block diagram of an example system for a file content preview tool, according to another example embodiment.

FIG. 3 is a block diagram of an example system 300 for a file content preview tool, according to an example embodiment. In the example of FIG. 3, the system 300 may include components that are similar or substantially similar to like numbered components of FIG. 1.

In the system 300, the selection tool 110 may select the file icon 108 associated with the file 104. For example, the selection tool 110 may be hovered over the file icon 108 by a user, thus conveying to the preview tool 102 a selection of the file 104. The selection tool 110 may also determine the result-class 112 for which the file 104 is to be parsed. In an example embodiment, a user may select one or more result-classes 112 from a list of possible result-classes 112, or there may be a separate instance or type of the selection tool 110 for each result-class 112. In another example embodiment, a default result-class 112 may be used. For example, the selected result-class 112 may be "address," wherein all the addresses located in the file 104 may be previewed.

Then, for example, the preview tool 102 may extract or copy the content 116 from the file 104 to the memory 128 using the application program interface 126. Using the application program interface 126, for example, the preview tool 102 may be able to access the content 116 of the file 104 without instantiating an instance of the file 104 or the application 122. In another example embodiment, the preview tool 102 may extract the content 116 from the file 104, even if the file 104 and/or the application 122 have been previously instantiated. This may, for example, allow the preview tool 102 to access the content 116 of the file 104 regardless of whether the application 122 is installed on the operating system 302 or not.

The operating system 302 may include a computer program on a device that manages the files, applications, programs and/or other features of the device. For example, the operating system 302 may include or provide the user interface 106 on which the file icon 108 may be displayed. The operating system 302 may also be able to access, or provide access to, the file 104 associated with the file icon 108. According to an example embodiment, the operating system 302 may or may not include the application 122; however, in either case, the preview tool 102 may extract the content 116 of the file 104 using the application program interface 126.

The extracted content 116 may be stored in the memory 128, where it may be scanned or parsed by the parser 130 based on the rules 114A, B, C, D, E, and F associated with the result-class 112. For example the result-class 112 "address" may include rules 114A-F including rule 114A "road", rule 114B "way", rule 114C "street", rule 114D "st.", rule 114E "court" and rule 114F "drive." Then for example, the parser 130 may parse the content 116 for content or portions of content 116A, B, C, D, E, and F that correspond to the rules 114A-F.

For example, the parser 130 may scan the content portions 116A-F for rules 114A-F and return content portions 116C, 116D, and 116E as the target-result 118 to the presentation logic 132. The presentation logic 132 may then provide the target-result 118, including the content portions 116C, D, and E corresponding to result-class 112 as determined from rules 114A-F to the results window 126.

The results window 126 may provide the target-result 118, including the content portions 116C, D and E, as selectable items in a pop-up window. For example, a user may select content portion 116E with a mouse or keyboard stroke to receive additional or complementary information 304 (or functionality) associated with the target-result 118.

The complementary information 304, for example, may be information associated with at least a portion of the target-result 118. For example, the complementary information 304 may include a link to a website, additional content 116, or virtually any other information that may be associated with the target-result 118. For example, the presentation logic 132 may be configured such that a selection of the content portion 116E from within the results window 120 may provide a pop-up window including the complementary information 304 which may be a map of the address "789 Third St." In another example, as just referenced, when the result-class 112 includes website links, the complementary information 304 may include an active link(s) to the presented website. In this way, for example, a user reviewing multiple files for websites may immediately select one of the presented websites in the results window 120 for accessing the website (e.g., in a separate browser that is automatically opened in response to the selection of the link).

Figure 4:
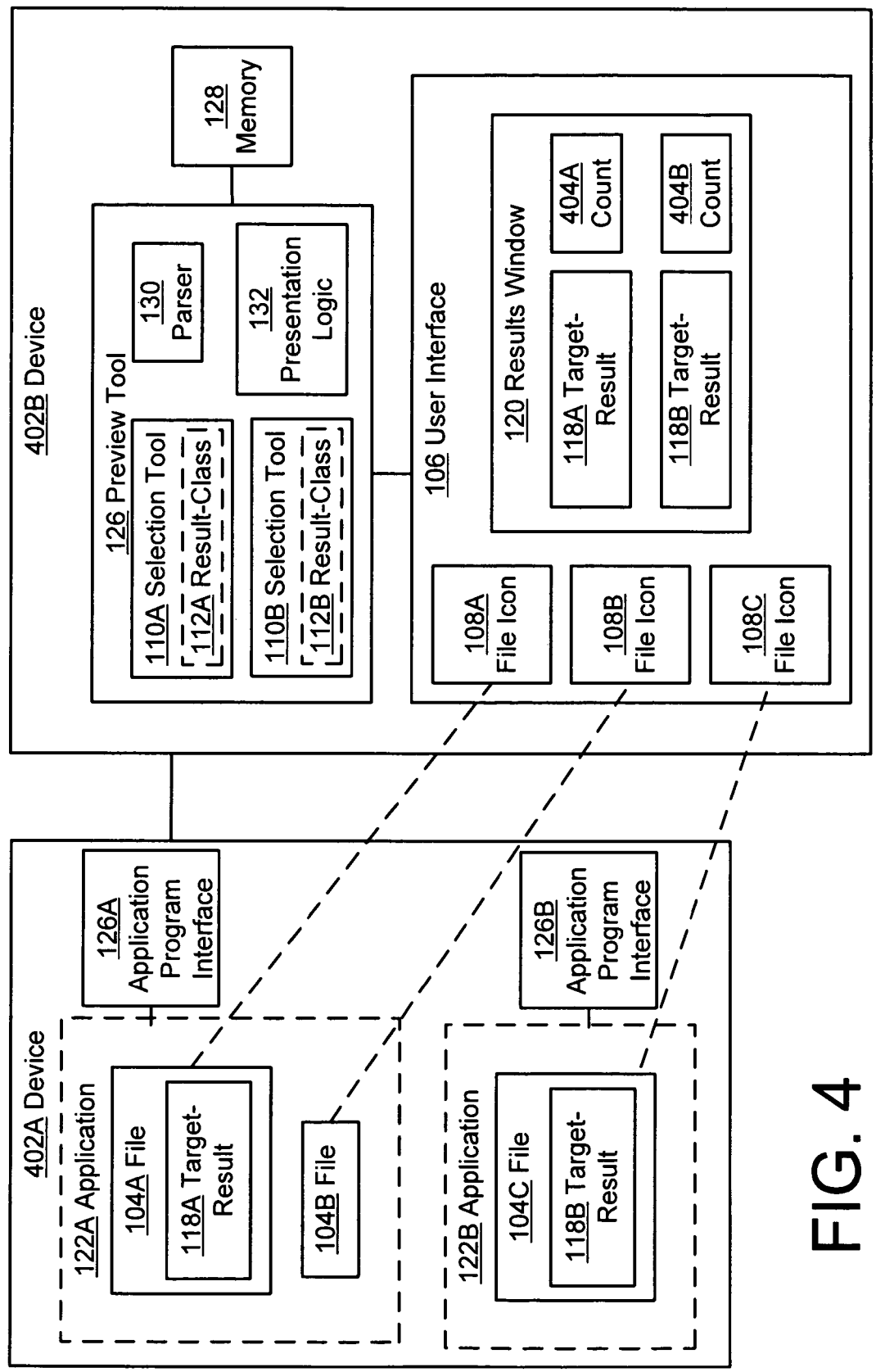
FIG. 4 is a block diagram of an example system for a file content preview tool, according to another example embodiment.

FIG. 4 is a block diagram of an example system 400 for a file content preview tool, according to an example embodiment. In the example of FIG. 4, the system 400 may include components that are similar or substantially similar to like numbered components of FIG. 1 and/or FIG. 3.

In the system 400, multiple selection tools 110A and 110B may be provided. According to an example embodiment, each selection tool 110A, B may correspond to a different result-class 112A or 112B. For example, a user wanting to preview a file or files for the result-class 112A may use the selection tool 110A. In an example embodiment the result-class 112A may be a single or a group of related result-classes 112A that a user may select.

Then for example, the selection tool 110B may be used to select file icons 108A, B and C. File icons 108A-C may represent files 104A-C, respectively which may reside on a device 402A.

The devices 402A and 402B may be devices configured to store files 104A-C and/or file icons 108A-C representing the files 104A-C. For example, the preview tool 102 may operate on the device 402B, wherein the file icons 108A-C appearing on the user interface 106 of the device 402B represent the files 104A-C, respectively, residing on the device 402A. According to an example embodiment, the device 402B may communicate with the device 402A via a WAN, LAN, intranet, the internet, or other network. According to another example embodiment, the files 104A-C may be stored on a CD-ROM or other storage media that may be read and/or otherwise accessed by the device 402B hosting the preview tool 102.

The preview tool 102 may then scan or parse the files 104A-C for rules associated with the selected result-class 112B. In an example embodiment, the files 104A, B and 104C may be associated with distinct applications 122A and 122B, respectively. The applications 122A, B may be different applications or programs associated with different application program interfaces 126A and 126B, respectively. For example, the application 122A may be a word processing application and the application 122B may be a spreadsheet application. The preview tool 102 may then use the varying application program interfaces 126A, B to access the content of the files 104A-C associated with the applications 122A, B.

According to an example embodiment, the preview tool 102 may then copy the files 104A-C or the content from the files 104A-C to the memory 128 wherein the files 104A-C may be scanned by parser 130 for target-results 118 associated with the result-class 112B. For example, upon examination of files 104A-C, parser 130 may determine that only file 104A and file 104C contain target results 118A and 118B, respectively, associated with the result-class 112B.

Then for example, the presentation logic 132 may provide the target-results 118A,B in the results window 120 along with counts 404A and 404B. The counts 404A and 404B may provide information as to the number of members or instances of content associated with the result-class 112B found in the files 104A-C. For example, the count 404A may provide the number of instances of content found to correspond to the result-class 11B in the file 104A.

Thus, for example, where the preview tool 102 in the examples of FIGS. 1, 3 and/or 4 may be associated with an operating system, such as the operating system 302, as opposed to the application 122 or any particular application, it will be appreciated that the preview tool 102 may be simultaneously interoperable with a number of different types of files, as just described. Consequently, as shown in FIG. 4 with respect to the file icons 108A-108C, the user interface 106 may simultaneously display files (or file icons) associated with more than one of a word processing application, a drawing application, a spreadsheet application, and a presentation application. Nonetheless, the selection tool 110 may implement a designated instance of the result class 112 for any and all of these application types, without having to open any of the associated applications.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
   a selection tool configured to determine a file selection of a file icon that is displayed on a user interface and that represents a file associated with an application, wherein the file includes content associated with one or more result-classes;
   the selection tool being configured to receive a selection of a result-class from the one or more result-classes, the one or more result-classes each identifying a category of information from amongst the content and corresponding to the file selection;
   a parser configured to receive one or more rules for the selected result-class of the application, the one or more rules including one or more identifiers to search for from within the content of the file that is a member of the result-class;
   the parser being configured to access the content of the file by way of an application program interface associated with the application while the file and/or the application is not instantiated, and parse the content of the file for a target-result, wherein the target-result is a member of the result-class and matches one or more of the rules; and
   presentation logic configured to provide at least a portion of the target-result in visual proximity to the file icon within the user interface.

2. The system of claim 1 wherein the selection tool is configured to determine a selection of a plurality of file icons displayed on the user interface and representing a plurality of files associated with one or more applications.

3. The system of claim 1 wherein the selection tool is configured to determine the selection of the file icon based on a hover over the file icon with a visual pointer icon for a period of time.

4. The system of claim 1 wherein the selection tool is configured to determine the selection of the file icon on a first device, wherein the file is stored on a second device.

5. The system of claim 1 comprising a plurality of selection tools in association with the user interface, each selection tool associated with at least one of a plurality of result-classes, wherein at least one of the plurality of selection tools is associated with the result-class.

6. The system of claim 1 wherein the selection tool is configured to determine the file selection of a word processing file, and the parser is configured to parse the word processing file for text that is a member of the selected result-class matches one or more of the rules.

7. The system of claim 1 wherein the parser is configured to determine a first rule of the one or more rules, wherein the first rule identifies members of the result-class within the content.

8. The system of claim 1 wherein the parser is configured to determine the one or more rules, wherein the one or more rules comprise one or more patterns and/or strings associated with the result-class, for which the content is to be parsed.

9. The system of claim 1 wherein the file includes metadata configured to provide information about the content.

10. The system of claim 9 wherein metadata includes one or more structured descriptions configured to separate the content into the one or more result-classes.

11. The system of claim 1 wherein the parser is configured to:
   access the content of the file using the application program interface associated with the application,
   load at least a portion of the content of the file into a memory, and
   parse the content within the memory to return the target-result.

12. The system of claim 1 wherein the parser is configured to parse the content of the file for the target-result, wherein the target-result includes at least a portion of the content of the file consistent with the one or more rules and/or the result-class.

13. The system of claim 1 wherein the presentation logic is configured to provide the target-result in visual proximity to the file icon and within a pop-up window associated with the file icon.

14. A method comprising:

receiving a selection of a file from a selection tool configured to select either the file and/or an icon representing the file, wherein the file comprises content associated with an application and the content includes members of one or more result-classes;

receiving a selection of one of the result-classes associated with the selection tool, and one or more rules for locating members of the result-class within the content;

parsing the content based on the one or more rules to determine a target-result including at least a portion of the content corresponding to the one or more rules, wherein the target-result is a member of the selected result-class and matches one or more of the rules; and displaying a results window including the target-result, wherein the target-result is configured to provide complementary information associated with the one or more portions of content upon selection.

15. A computer program product, embodied on a computer-readable medium and including executable code that, when executed, is configured to cause a data processing apparatus to:

locate a file in an operating system;

extract content from an uninstantiated instance of the file;

store the content of the file in a memory;

parse the stored content for one or more portions of the content that is a member of the result-class and is consistent with rules, the result-class including a category of information within the stored content and the rules including one or more identifiers to search for from within the content of the file that is a member of the result-class; and display the one or more portions of content as selectable icons in a results window provided in association with the file, wherein the selectable icons are configured to provide complementary information associated with the one or more of the portions of content, upon selection.

16. The computer program product of claim 15 wherein data processing apparatus configured to display is configured to:

determine which of the one or more portions of content are duplicative; and display non-duplicative portions of content in association with a count corresponding to the duplicative portions of content.

* * * * *